United States Patent
Jothimurugesan et al.

(10) Patent No.: US 9,687,825 B1
(45) Date of Patent: Jun. 27, 2017

(54) STABLE TUNGSTEN-PHOSPHORUS MODIFIED SUPPORT FOR A FISCHER-TROPSCH CATALYST

(71) Applicant: Chevron U.S.A. Inc., San Ramon, CA (US)

(72) Inventors: Kandaswamy Jothimurugesan, Hercules, CA (US); Mark Muraoka, Walnut Creek, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 15/193,399

(22) Filed: Jun. 27, 2016

(51) Int. Cl.
| | |
|---|---|
| B01J 27/188 | (2006.01) |
| B01J 23/75 | (2006.01) |
| B01J 37/02 | (2006.01) |
| B01J 37/08 | (2006.01) |
| B01J 35/10 | (2006.01) |
| C10G 2/00 | (2006.01) |

(52) U.S. Cl.
CPC ............ *B01J 27/188* (2013.01); *B01J 23/75* (2013.01); *B01J 35/1038* (2013.01); *B01J 37/0201* (2013.01); *B01J 37/024* (2013.01); *B01J 37/08* (2013.01); *C10G 2/332* (2013.01)

(58) Field of Classification Search
CPC . B01J 27/188; B01J 23/75; B01J 21/04; B01J 21/06; B01J 21/063; B01J 21/08; B01J 35/1035; B01J 35/1042; B01J 37/0201; B01J 37/024; B01J 37/08; C07C 29/154; C07C 29/156; C07C 29/157; C07C 29/1512; C07C 2523/75; C07C 2523/89
USPC ....... 502/208, 210, 324, 326, 330, 303–304; 518/713, 715
See application file for complete search history.

(56) References Cited

U.S. PATENT DOCUMENTS

| | | | |
|---|---|---|---|
| 5,714,660 A * | 2/1998 | Wu | .......................... C07C 4/18 585/483 |
| 9,168,512 B1 | 10/2015 | Jothimurugesan | |
| 9,192,921 B1 | 11/2015 | Jothimurugesan et al. | |
| 9,327,273 B2 | 5/2016 | Barradas et al. | |
| 9,334,203 B2 | 5/2016 | Small et al. | |
| 2013/0131399 A1 | 5/2013 | Weiner et al. | |
| 2013/0245312 A1 * | 9/2013 | Nagaki | .................. B01J 27/199 560/214 |
| 2016/0067687 A1 * | 3/2016 | Jothimurugesan | ..... B01J 27/198 518/715 |
| 2016/0089662 A1 * | 3/2016 | Jothimurugesan | ..... C10G 2/332 502/209 |
| 2016/0107144 A1 | 4/2016 | Davidian et al. | |

FOREIGN PATENT DOCUMENTS

| | | |
|---|---|---|
| CA | 2851988 A1 | 4/2013 |
| WO | 2014133236 A1 | 9/2014 |
| WO | 2014210090 A1 | 12/2014 |

* cited by examiner

Primary Examiner — Patricia L Hailey
(74) Attorney, Agent, or Firm — Susan M. Abernathy

(57) ABSTRACT

A process to make a Fischer-Tropsch catalyst with improved hydrothermal stability, comprising:
a. contacting a crystalline oxide material with a solution of a tungsten and a phosphorus to make a tungsten-phosphorus modified support;
b. calcining the tungsten-phosphorus modified support at a temperature less than or equal to 750° C. to make a calcined tungsten-phosphorus modified support that has the improved hydrothermal stability and that can be used to support a Co-loaded Fischer-Tropsch catalyst. A Co-loaded Fischer-Tropsch catalyst having improved hydrothermal stability and higher C5+ hydrocarbon productivity is also provided. A Fischer-Tropsch synthesis process is provided, comprising contacting a gaseous mixture comprising a carbon monoxide and a hydrogen with the Co-loaded Fischer-Tropsch catalyst having the improved hydrothermal stability and higher C5+ productivity, at a pressure of from 0.1 to 3 MPa and at a reaction temperature of from 180 to 260° C., thereby producing a product comprising C5+ hydrocarbons.

21 Claims, No Drawings

STABLE TUNGSTEN-PHOSPHORUS MODIFIED SUPPORT FOR A FISCHER-TROPSCH CATALYST

TECHNICAL FIELD

The present disclosure relates generally to catalysts for use in Fischer-Tropsch processes in which synthesis gas is converted to hydrocarbon products.

BACKGROUND

It is desired to have a cobalt Fischer-Tropsch catalyst having improved hydrothermal stability for use in slurry reactors performing Fischer-Tropsch synthesis reactions. It is further desired to have a cobalt Fischer-Tropsch catalyst having improved catalytic activity for carbon monoxide (CO) conversion or $C_{5+}$ productivity.

SUMMARY

We provide a process to make a Fischer-Tropsch catalyst with an improved hydrothermal stability, comprising:
a. contacting a crystalline oxide material with a solution of a tungsten and a phosphorus to make a tungsten-phosphorus modified support; and
b. calcining the tungsten-phosphorus modified support at a temperature less than or equal to 750° C. to make a calcined tungsten-phosphorus modified support that has the improved hydrothermal stability and that can be used to support a Co-loaded Fischer-Tropsch catalyst.

We also provide a Co-loaded Fischer-Tropsch catalyst having improved hydrothermal stability and higher C5+ hydrocarbon productivity, made by the process of this invention. We also provide a Fischer-Tropsch synthesis process, comprising contacting a gaseous mixture comprising a carbon monoxide and a hydrogen with the Co-loaded Fischer-Tropsch catalyst having the improved hydrothermal stability and higher $C_{5+}$ productivity, at a pressure of from 0.1 to 3 MPa and at a reaction temperature of from 180 to 260° C., thereby producing a product comprising $C_{5+}$ hydrocarbons.

The present invention may suitably comprise, consist of, or consist essentially of, the elements in the claims, as described herein.

These and other objects, features and advantages of the present invention will become better understood with reference to the following description and appended claims.

GLOSSARY

A "Fischer-Tropsch catalyst" is a catalyst that promotes a hydrocarbon synthesis from hydrogen and carbon monoxide to produce waxy hydrocarbons.

"Hydrothermal stability" in the context of this disclosure refers to the resistance to loss of pore volume when a crystalline oxide material is exposed to steam. A suitable hydrothermal stability test to assess this feature is disclosed herein.

"Crystalline oxide material" refers to a solid material whose constituents, including oxygen, are arranged in a highly ordered microscopic structure, forming a crystal lattice that extends in all directions.

"Solution" refers to a single, homogeneous liquid phase that is a mixture in which the components are uniformly distributed throughout the mixture.

A "catalyst support" is the solid material, with a high surface area, to which a catalyst is affixed. Catalyst supports in the context of this disclosure generally have a specific surface area of at least 75 $m^2/g$, as determined by the nitrogen Brunauer-Emmett-Teller (BET) method described in Brunauer, Stephen; Emmett, P. H.; Teller, Edward (1938). "Adsorption of Gases in Multimolecular Layers". Journal of the American Chemical Society 60 (2): pp 309-319.

"Calcining" refers to heating to high temperatures in air or oxygen, wherein a modified support is converted to a calcined modified support that has transformed properties.

"Particles" refer to minute fragments or quantities of matter.

"Steam" is the vapor into which water is converted when heated to its boiling point, forming a white mist of minute water droplets in the air.

DETAILED DESCRIPTION

The process to make the Fischer-Tropsch catalyst comprises contacting the crystalline oxide materials with a solution of tungsten and phosphorus to make the tungsten-phosphorus modified support. The crystalline oxide material can be any crystalline material that will incorporate tungsten and phosphorus onto, and/or into the crystalline oxide material to make the tungsten-phosphorus modified support. In one embodiment, the crystalline oxide material is selected from the group consisting of silica, alumina, zirconia, titania, ceria, lanthanum oxide, and mixtures thereof.

In one embodiment, the crystalline oxide material is an alumina. Examples of alumina include gamma alumina, delta alumina, theta alumina, and mixtures thereof. In different embodiments, the alumina can be a mixture of gamma and delta alumina, or the alumina can be gamma alumina. Some commercial examples of gamma alumina include: PURALOX® TM 100/150, PURALOX® TH 100/150, PURALOX® SCFa-140, and PURALOX® SCCa 5/150. PURALOX® is a registered trademark of SASOL Germany GmbH, and PURALOX® aluminas are derived from the controlled activation of high purity boehmite aluminas.

In one embodiment, the crystalline oxide material has an average particle size from 50 to 120 μm, such as from 60 to 100 μm. In one embodiment, the crystalline oxide material is an alumina having a particle size distribution from 10 μm to 200 μm. An example of a crystalline oxide material having this particle size distribution is PURALOX® SCCa 5/150. PURALOX® SCCa 5/150 has an average particle size of about 80-90 μm. Particle size, in the context of this disclosure, is determined by laser diffraction using a HORIBA LA-960 Laser Particle Size Analyzer instrument. The LA-960 laser diffraction instrument consists of two light sources, a sample handling system to control the interaction of particles and incident light, and an array of high quality photodiodes to detect the scattered light over a wide range of angles. The scattered light collected on the detectors is used to calculate the particle size distribution and the average particle size of the sample analyzed using Mie Theory.

In one embodiment, the crystalline oxide material has a total nitrogen BET pore volume of from 0.4 $cm^3/g$ to 1.0 $cm^3/g$.

Contacting:

The contacting of the crystalline oxide material with the solution of the tungsten and the phosphorus can be done by any suitable method, including for example, impregnation, precipitation, chemical vapor deposition, or combinations thereof. In one embodiment, the contacting is done by impregnation with the solution. In one embodiment, the impregnation with the solution can be either incipient wetness impregnation or slurry phase impregnation. The solution can be aqueous, or non-aqueous.

In one embodiment, the solution is acidic. The pH of the solution can be less than 4, such as from 0.2 to less than 4, or from 0.4 to less than 2, or even from 0.4 to 1.5.

The solution comprises both tungsten and phosphorus in a combined amount greater than 0.5 wt %. In one embodiment the solution comprises from 1.0 to 10 wt % of the tungsten and the phosphorus. In one embodiment, the solution has a molar ratio of the tungsten to the phosphorus greater than 0.005, such as from 0.01 to 5.0, or from 0.05 to 4.0.

Tungsten compounds that are soluble in water, and which may be used in the solution include: sodium tungstate and ammonium tungsten salts. The tungsten in the solution may comprise monotungstate ions $[WO_4]^{2-}$, or polyoxo tungstate ions, such as metatungstate, paratungstate, and other soluble forms. Suitable tungsten compounds are for example, ammonium tungsten oxide hydrates such as ammonium metatungstate, or ammonium paratungstate.

In one embodiment, the phosphorus in the solution is phosphoric acid. In one embodiment, the phosphorus can comprise cobalt phosphate. Other phosphorus compounds that can be used, but can have some drawbacks, include phosphorus oxychloride, phosphorus trichloride, and phosphorus pentoxide. The phosphorus compounds containing chlorides can poison Co-loaded Fischer-Tropsch catalysts. Phosphorus pentoxide reacts violently with water so should be used in a non-aqueous solution.

In one embodiment, the solution is aqueous and comprises ammonium metatungstate and phosphoric acid.

In one embodiment, the solution is heated to facilitate dissolution of the tungsten and the phosphorus. For example, the solution can be heated to 35 to 90° C.

In one embodiment, the tungsten-phosphorus modified is dried before calcining. The drying can be done slowly, such as at a drying temperature of 105 to 130° C. In one embodiment, the drying time can be from five to 48 hours. The drying can be done in air. The drying can help with spreading the tungsten and phosphorus over the entire crystalline oxide material.

Calcining of the Tungsten-Phosphorus Modified Support:

The process to make the Fischer-Tropsch catalyst comprises calcining the tungsten-phosphorus modified support at an elevated temperature that is less than or equal to 750° C. to make the calcined tungsten-phosphorus modified support. The elevated temperature is higher than the drying temperature, and in one embodiment, can be from 200° C. to 750° C., or from 300° C. to 750° C. In one embodiment, the calcining is done in flowing air.

In one embodiment, the calcining is done using a slow heating rate of, for example, less than 4° C./min. Examples of slow heating rates that can be used include from 0.3 to 3° C./min, such as from 0.5 to 2° C./min. In one embodiment, once a maximum elevated temperature for the calcining is met the maximum elevated temperature is held steady for from one to twenty hours.

In one embodiment, the calcined tungsten-phosphorus modified support has a total nitrogen BET pore volume greater than 0.1 cm$^3$/g, such as from 0.2 to 0.6 cm$^3$/g.

In one embodiment, the calcined tungsten-phosphorus modified support has less than 30%, or less than 25%, of its total nitrogen BET pore volume lost when exposed to steam in a hydrothermal stability test with a heating duration of 2 hours. For example, the calcined tungsten-phosphorus modified support can have only 2 to 15% of its total nitrogen BET pore volume lost in the hydrothermal stability test.

Impregnating with Cobalt:

In one embodiment, the process additionally comprises impregnating the calcined tungsten-phosphorus modified support with a dissolved solution of a cobalt to make the Co-loaded Fischer-Tropsch catalyst. The cobalt is in the form of an inorganic compound, such as an inorganic salt of the cobalt. Examples of the cobalt include cobalt nitrates, such as cobalt(II) nitrate hexahydrate. Other inorganic cobalt compounds include cobalt(II) fluoride, cobalt(II) oxide, cobalt(II) phosphate, cobalt(II) bromide, cobalt(II) chloride, cobalt(II) sulfate, and cobalt(II) acetate.

In one embodiment the impregnating is done by incipient wetness impregnation or slurry phase impregnation.

In one embodiment, the dissolved solution of the cobalt is aqueous.

In one embodiment, the following impregnating steps are used: a) the calcined tungsten-phosphorus modified support is contacted with the dissolved solution of the cobalt to make an impregnated intermediate material, and b) the impregnated intermediate material is dried. Multiple impregnations can be done by repeating steps a) and b) until a desired loading of the cobalt on the impregnated intermediate material is achieved. In one embodiment, the number of impregnations is from two to six.

In one embodiment, the Co-loaded Fischer-Tropsch catalyst comprises from 3 to 50 wt % of the cobalt, such as from 5 to 45 wt % of the cobalt.

The drying can be done at a drying temperature between 25 to 150° C., to evaporate the solvent that was used in the dissolved solution of the cobalt. In one embodiment, the drying is done in air. In one embodiment, the drying can be done over a drying time of 5 to 48 hours. The drying can assist with spreading the cobalt, and any other metals, over the calcined tungsten-phosphorus modified support.

In one sub-embodiment, a step c) of calcining can be additionally used to improve dispersal of the cobalt and to decompose metal salts. In one embodiment, the calcining of the impregnated intermediate material is done in flowing air. In one embodiment, the calcining of the impregnated intermediate material is done at a lower temperature than the calcining temperature used for calcining the tungsten-phosphorus modified support, as described earlier.

In one embodiment, the calcining in step c) is done at a temperature from 200 to 350° C. In one embodiment, the calcining in step c) is done using a slow heating rate of, for example, less than 4° C./min. Examples of slow heating rates that can be used include from 0.3 to 3° C./min, such as from 0.5 to 2° C./min. In one embodiment, once a maximum elevated temperature for the calcining in step c) is met the maximum elevated temperature is held steady for from one to ten hours. The calcining of the impregnated intermediate material can be done in multiple steps, after each drying step b), or at the end of the multiple impregnation steps a) and b).

In one embodiment, the dissolved solution of the cobalt can additionally comprise a glutaric acid. In a sub-embodiment, a ratio of the glutaric acid in the dissolved solution to a surface area of the calcined tungsten-phosphorus modified support during the impregnating is greater than 1 μmol/m$^2$, such as from 2 to 15 μmol/m$^2$, or from 5 to 10 μmol/m$^2$.

In one embodiment, the dissolved solution of the cobalt additionally comprises one or more promoters. In a sub-embodiment, the one or more promoters are selected from the group consisting of platinum, palladium, ruthenium, manganese, silver, lanthanum, and cerium.

Co-Loaded Fischer-Tropsch Catalyst:

The Co-loaded Fischer-Tropsch catalyst has significantly improved hydrothermal stability. The improved hydrothermal stability makes it an improved support material for use in Fischer-Tropsch synthesis processes that expose the Co-loaded Fischer-Tropsch catalyst to water at high temperatures. In one embodiment, the Co-loaded Fischer-Tropsch catalyst has less than 7%, or from 2 to less than 5%, of its total nitrogen BET pore volume lost when exposed to steam in a hydrothermal stability test with a heating duration of 500 hours.

In one embodiment, the Co-loaded Fischer-Tropsch catalyst has improved hydrothermal stability and also higher $C_{5+}$ hydrocarbon productivity. These properties can be evidenced after a step of activating the Co-loaded Fischer-Tropsch catalyst. The step of activating can be done by reducing the impregnated intermediate material.

The activating of the Co-loaded Fischer-Tropsch catalyst can be done by placing the impregnated intermediate material in a muffle furnace. In one embodiment, the activating is done in a tube reactor in a muffle furnace. The impregnated intermediate material can be purged first with nitrogen gas at ambient temperature, after which the gas feed to the muffle furnace can be changed to hydrogen. In one embodiment, the hydrogen gas feed is pure hydrogen. Depending on the configuration of the muffle furnace, the gas flow in the muffle furnace can be upward, downward, turbulent, or horizontal.

In one embodiment, the tube reactor temperature in the muffle furnace is slowly increased, such as at a rate of 0.5 to 3° C./min, up to a maximum temperature. The maximum temperature can be from 300 to 500° C. The maximum temperature in the muffle furnace can be held steady for five to fifteen hours. After this time, the gas feed can be switched to nitrogen, or other inert gas, to purge the system. The tube reactor in the muffle furnace can then be cooled. In one embodiment, the tube reactor in the muffle furnace is cooled to ambient temperature. After cooling, a gas mixture comprising oxygen and nitrogen can be passed over the catalyst bed in the muffle furnace to passivate the catalyst. After a passivation time of five to twenty hours, the gas feed to the muffle furnace can be changed to pure air. In one embodiment, the flow rate of the pure air is lower than the flow rate of the gas mixture comprising oxygen and nitrogen. For example the flow rate of the gas mixture comprising oxygen and nitrogen can be from 500 to 1000 standard cubic centimeters per minute (sccm), and the flow rate of the pure air can be 100 to 400 sccm. The time for the treatment with pure air can be from ½ hour to 5 hours. The activated Co-loaded Fischer-Tropsch catalyst activated as described above is then suitable for use in a Fischer-Tropsch synthesis reaction.

In one embodiment, the Co-loaded Fischer-Tropsch catalyst that has been activated provides greater CO conversion in a Fischer-Tropsch synthesis reaction than other Co-loaded Fischer-Tropsch catalysts that are otherwise similar, except that they are made with a different solution of a vanadium and the phosphorus to make a vanadium-phosphorus modified support instead of the tungsten-phosphorus modified support. We provide herein a Co-loaded Fischer-Tropsch catalyst not only having proved hydrothermal stability and higher $C_{5+}$ hydrocarbon productivity, but additionally providing greater CO conversion.

In one embodiment, the Co-loaded Fischer-Tropsch catalyst comprises from 5 to 45 wt % of the cobalt. In one embodiment, the Co-loaded Fischer-Tropsch catalyst comprises from 0.01 to 5 wt % of one or more promoters. In one embodiment, the Co-loaded Fischer-Tropsch catalyst comprises 0.01 to 5 wt % of the one or more promoters selected from the group consisting of platinum, palladium, ruithenium, manganese, silver, lanthanum, and cerium.

In one embodiment the Co-loaded Fischer-Tropsch catalyst has a total nitrogen BET pore volume greater than 0.2 $cm^3/g$.

In one embodiment, wherein the dissolved solution of the cobalt additionally comprises the glutaric acid, the resulting Co-loaded Fischer-Tropsch catalyst can have cobalt oxide ($Co_3O_4$) crystallites having an average particle size of 6 to 20 nm, which can provide higher catalytic activity for the Fischer-Tropsch synthesis reaction.

In one embodiment, a Fischer-Tropsch synthesis process is conducted using the Co-loaded Fischer-Tropsch catalyst as described herein. The Fischer-Tropsch synthesis process can comprise contacting a gaseous mixture comprising a carbon monoxide and a hydrogen with the Co-loaded Fischer-Tropsch catalyst, at a pressure of from 0.1 to 3 MPa and at a reaction temperature of from 180 to 260° C., thereby producing a product comprising $C_{5+}$ hydrocarbons. The Fischer-Tropsch synthesis process can occur in a slurry reactor or in a continuously stirred tank reactor (CSTR). In one embodiment, the resulting product from the Fischer-Tropsch synthesis process comprises at least 85 mol % selectivity for $C_{5+}$ hydrocarbons. In one embodiment, the $C_{5+}$ productivity in the Fischer-Tropsch synthesis process is from 0.530 to 0.600 g/g/h.

In one embodiment, the Fischer-Tropsch synthesis process is conducted at a space velocity during the contacting that is greater than 500 cc/g/h, such as from 1000 to 10,000 cc/g/h. In one embodiment, the CO conversion during the contacting is greater than 35 mol %, such as from 40 to 60 mol %.

In one embodiment, the Fischer-Tropsch synthesis process is conducted at a hydrogen to carbon monoxide molar ratio of 1.2 to 2.0 in the gaseous mixture.

EXAMPLES

Comparative Example 1

A gamma alumina support, Puralox SCCa 5/150 (obtained from Sasol Chemicals North America LLC), was used as a catalyst support. This gamma alumina support was used in all of the comparative examples, as well as the examples of this invention, described herein.

Comparative Example 2

Vanadium and phosphorous were supported on the gamma alumina support by impregnation with vanadium and phosphorus at a molar ratio of vanadium to phosphorus of 0.3. Ammonium metavanadate [$NH_4VO_3$], obtained from Sigma-Aldrich, St. Louis, Mo., was first added to distilled water and then phosphoric acid, obtained from Sigma-Aldrich, St. Louis, Mo., was added to the vanadium solution. This solution was stirred for one hour at 70° C. The solution was cooled down to room temperature and then added to the gamma alumina support by the incipient wetness impregnation method. The resulting material was then dried in an oven at 120° C. overnight. Finally, this dried modified gamma alumina support was calcined at 750° C. for two hours in a muffle furnace.

Comparative Example 3

A three-step incipient wetness impregnation method was used to prepare a Fischer-Tropsch catalyst from the dried and calcined modified gamma alumina support described in Comparative Example 2. A solution was prepared by dissolving cobalt(II) nitrate hexahydrate, obtained from Sigma-Aldrich), tetraammineplatinum(II) nitrate, obtained from Alfa Aesar, lanthanum (III) nitrate hexahydrate, obtained from Sigma-Aldrich, and glutaric acid, obtained from Sigma-Aldrich, in water. The amount of glutaric acid used was 9.06 acid/m$^2$ surface area of the modified support. The modified gamma alumina support from Comparative Example 2 was impregnated by using one third of the solution described above to achieve incipient wetness. The prepared Fischer-Tropsch catalyst was then dried in air at 120° C. for 16 hours in a box furnace and was subsequently calcined in air by raising its temperature at a heating rate of 1° C./min. to 300° C., and holding it at that temperature for two hours before cooling it back to ambient temperature. The above procedure was repeated to obtain the following loading of Co, Pt, and La$_2$O$_3$ on the support: 25 wt % Co, 0.05 wt % Pt, 1 wt % La$_2$O$_3$, and 73.95 wt % alumina.

Comparative Example 4

A three-step incipient wetness impregnation method was used to prepare a Fischer-Tropsch catalyst from the dried calcined modified gamma alumina support described in Comparative Example 2. A solution was prepared by dissolving cobalt(II) nitrate hexahydrate, obtained from Sigma-Aldrich, ruthenium(II) nitrosylnitrate, obtained from Alfa Aesar, and lanthanum(III) nitrate hexahydrate, obtained from Sigma-Aldrich, and glutaric acid, obtained from Sigma-Aldrich, in water. The amount of glutaric acid used was 8.06 acid/m$^2$ surface area of the modified support. The dried calcined modified gamma alumina support from Comparative Example 2 was impregnated by using one—third of this solution to achieve incipient wetness. The resulting prepared Fischer-Tropsch catalyst was then dried in air at 120° C. for 16 hours in a box furnace and was subsequently calcined in air by raising its temperature at a heating rate of 1° C./min. to 300° C. and holding it at that temperature for two hours before cooling it back to ambient temperature. The above procedure was repeated to obtain the following loading of Co, Pt, and La$_2$O$_3$ on the support: 25 wt % Co, 0.5 wt % Ru, 1 wt % La$_2$O$_3$, and 73.5 wt % alumina.

Example 1 (Invention)

Tungsten and phosphorous were supported on gamma alumina by impregnation with tungsten and phosphorous at a molar ratio of tungsten to phosphorous of 0.15. Ammonium metatungstate (NH$_4$)$_6$[H$_2$W$_{12}$O$_{40}$], obtained from Sigma-Aldrich, St. Luis, Mo., was first added to distilled water and then phosphoric acid, obtained from Sigma-Aldrich, St. Louis, Mo., was added to the tungsten solution. The pH of this tungsten-phosphorus solution was 0.8. This solution was added to the gamma alumina by an incipient wetness impregnation method. The resulting prepared material was then dried in air in an oven at 120° C. overnight. Finally, this dried modified gamma alumina support was calcined at 750° C. for two hours in a muffle furnace.

Example 2 (Invention)

A three-step incipient wetness impregnation method was used to prepare a Fischer-Tropsch catalyst. A solution was prepared by dissolving cobalt(II) nitrate hexahydrate, obtained from Sigma-Aldrich, St. Louis, Mo., tetraammineplatinum(II) nitrate, obtained from Alfa Aesar, lanthanum (III) nitrate hexahydrate, obtained from Sigma-Aldrich, St. Louis, Mo., and glutaric acid, obtained from Sigma-Aldrich, St. Louis, Mo., in water. The amount of glutaric acid used was 8.06 µmol/m$^2$ surface area of the modified support. The dried and calcined modified gamma alumina support from Example 1 was impregnated by using one-third of this solution to achieve incipient wetness. The prepared Fischer-Tropsch catalyst was then dried in air at 120° C. for 16 hours in a box furnace and was subsequently calcined in air by raising its temperature at a heating rate of 1° C./min. to 300° C. and holding it at that temperature for two hours before cooling it back to ambient temperature. The above procedure was repeated to obtain the following loading of Co, Pt, and La$_2$O$_3$ on the support: 25 wt % Co, 0.05 wt % Pt, 1 wt % La$_2$O$_3$, and 73.95 wt % alumina.

Example 3 (Invention)

A three-step incipient wetness impregnation method was used to prepare a Fischer-Tropsch catalyst. A solution was prepared by dissolving cobalt(II) nitrate hexahydrate, obtained from Sigma-Aldrich, St. Louis, Mo., ruthenium(II) nitrosylnitrate, obtained from Alfa Aesar, lanthanum(III) nitrate hexahydrate, obtained from Sigma-Aldrich, St. Louis, Mo., and glutaric acid, obtained from Sigma-Aldrich, St. Louis, Mo., in water. The amount of glutaric acid used was 8.06 µmol/m$^2$ surface area of the modified support. The dried and calcined modified gamma alumina support from Example 1 was impregnated by using one-third of this solution to achieve incipient wetness. The prepared Fischer-Tropsch catalyst was then dried in air at 120° C. for 16 hours in a box furnace and was subsequently calcined in air by raising its temperature at a heating rate of 1° C./min. to 300° C. and holding it at that temperature for two hours before cooling it back to ambient temperature. The above procedure was repeated to obtain the following loading of Co, Ru, and La$_2$O$_3$ on the support: 25 wt % Co, 0.5 wt % Ru, 1 wt % La$_2$O$_3$, and 73.5 wt % alumina.

Example 4 (Invention)

A three-step incipient wetness impregnation method was used to prepare a Fischer-Tropsch catalyst. A solution was prepared by dissolving cobalt(II) nitrate hexahydrate, obtained from Sigma-Aldrich, St. Louis, Mo., ruthenium(II) nitrosylnitrate, obtained from Alfa Aesar, manganese nitrate, obtained from Sigma-Aldrich, St. Louis, Mo., lanthanum (III) nitrate hexahydrate, obtained from Sigma-Aldrich, St. Louis, Mo., and glutaric acid, obtained from Sigma-Aldrich, St. Louis, Mo., in water. The amount of glutaric acid used was 8.06 µmol/m$^2$ surface area of the modified support. The dried and calcined modified gamma alumina support from Example 1 was impregnated by using one-third of this solution to achieve incipient wetness. The prepared Fischer-Tropsch catalyst was then dried in air at 120° C. for 16 hours in a box furnace and was subsequently calcined in air by raising its temperature at a heating rate of 1° C./min. to 300° C. and holding it at that temperature for two hours before cooling it back to ambient temperature. The above procedure was repeated to obtain the following loading of Co, Ru, Mn, and La$_2$O$_3$ on the support: 25 wt % Co, 0.5 wt % Ru, 1 wt % Mn, 1 wt % La$_2$O$_3$, and 72.5 wt % alumina.

Example 5: Hydrothermal Stability of Catalyst Supports

Characterization of the hydrothermal stability of the catalyst supports was made by contacting 2 grams of each catalyst support in contact with 30 g of water at 230° C. for two hours in an autoclave in a static mode under autogenous pressure. Each support sample was cooled down to room temperature and then dried at 120° C. for two hours. Each support sample was analyzed for its change in total nitrogen BET pore volume by comparing the pore volumes before and after the steaming steps described above. The total nitrogen BET pore volumes were determined using nitrogen adsorption/desorption isotherms measured at −196° C. using a Tristar analyzer obtained from Micromeritics Instrument Corporation (Norcross, Ga.). Prior to determining the pore volumes, the support samples were degassed at 190° C. for four hours. Table 1 shows the percent change in total nitrogen BET pore volume, as calculated by the following formula:

% Change=(pore volume before steam test−pore volume after steam test)/(pore volume before steam test)

TABLE 1

| Example Number | Total Nitrogen BET Pore Volume, cm³/g | | |
|---|---|---|---|
| | Before Steam Test | After Steam Test | % Change |
| Comparative Example 1 | 0.5067 | 0.1020 | 79.8 |
| Comparative Example 2 | 0.3933 | 0.2816 | 28.4 |
| Example 1 | 0.4125 | 0.3540 | 14.1 |

From Table 1 it is evident that the tungsten-phosphorus modified support, Example 1, had much better hydrothermal stability compared to the unmodified gamma alumina support (Comparative Example 1), and the vanadium-phosphorus modified support (Comparative Example 2). The tungsten-phosphorus modified support lost no more than 15% of its total nitrogen BET pore volume when exposed to steam in this hydrothermal stability test.

Example 6: Hydrothermal Stability of Fischer-Tropsch Catalysts

Characterization of the hydrothermal stability of the Fischer-Tropsch catalysts was made by contacting 2 grams of each catalyst in contact with 30 g of water at 230° C. for 500 hours in an autoclave in a static mode under autogenous pressure. Each Fischer-Tropsch catalyst sample was cooled down to room temperature and then dried at 120° C. for two hours. Each Fischer-Tropsch catalyst sample was analyzed for its change in total nitrogen BET pore volume by comparing the total nitrogen BET pore volumes before and after the steaming steps, as described previously. Table 2 shows the % Change in total nitrogen BET pore volumes of two different Fischer-Tropsch catalysts.

TABLE 2

| Example Number | Total Nitrogen BET Pore Volume, cm³/g | | |
|---|---|---|---|
| | Before Steam Test | After Steam Test | % Change |
| Comparative Example 3 | 0.2143 | 0.1972 | 7.97 |
| Example 2 | 0.2175 | 0.2097 | 3.58 |

From Table 2 it is evident that the Fischer-Tropsch catalyst with the tungsten-phosphorus modified support, Example 2, had much better hydrothermal stability compared to the Fischer-Tropsch catalyst with the vanadium-phosphorus modified support, Comparative Example 2.

Example 7: Activation of Fischer-Tropsch Catalysts

Twenty grams of each Fischer-Tropsch catalyst described above was separately charged to a glass tube reactor. Each glass tube reactor was placed in muffle furnace with an upward gas flow. Each glass tube reactor was purged first with nitrogen gas at ambient temperature, after which time the gas feed was changed to pure hydrogen with a flow rate of 750 standard cubic centimeters per minute (sccm). The temperature in the muffle furnace was increased to 350° C. at a rate of 1° C./min. and then held at that temperature for ten hours. After this time, the gas feed was switched to nitrogen to purge the system and the muffle furnace was then cooled to ambient temperature. After cooling to ambient temperature, a gas mixture of 1 vol % $O_2/N_2$ was passed up through the charged glass tube reactor at 750 standard cubic centimeters per minute (sccm) for 10 hours to passivate the Fischer-Tropsch catalyst. At this point, no heating was applied; however, oxygen chemisorption and a partial oxidation exotherm caused a momentary temperature rise. After the 10 hours of catalyst passivation, the gas feed was changed to pure air, the gas flow rate was lowered to 200 sccm, and then the gas flow rate was kept at the lower gas flow rate for two hours. Finally the Fischer-Tropsch catalyst was discharged from the glass tube reactor.

A 1-liter continuously stirred tank reactor (CSTR) was used for a slurry Fischer-Tropsch synthesis reaction. The Fischer-Tropsch catalyst was transferred to the CSTR unit to mix with 300 g of C-80 Sasol wax, obtained from Sasol North America Corp., Hayward, Calif. The Fischer-Tropsch catalyst was flushed with nitrogen for two hours, after which time the gas feed was switched to pure hydrogen at a flow rate of 500 sccm. The temperature in the CSTR unit was slowly raised to 120° C. at a heating rate of 1° C./min., and held at 120° C. for 1 hour. Then the temperature in the CSTR unit was slowly raised to 250° C. at a heating rate of 1° C./min. and held at 250° C. for 10 hours. After this heating, the Fischer-Tropsch catalyst was cooled to 180° C., while remaining under the flow of pure hydrogen gas.

Example 8: Fischer-Tropsch Catalyst Activity

The Fischer-Tropsch catalysts prepared and activated as described above were each subjected to a synthesis run in which the Fischer-Tropsch catalyst was contacted with syngas containing hydrogen and carbon monoxide in the CSTR slurry reactor. Experimental conditions and results of these synthesis runs are given in Table 3.

TABLE 3

|  | Comparative Example 3 | Example 2 | Comparative Example 4 | Example 3 | Example 4 |
|---|---|---|---|---|---|
| Support Modifiers | V-P | W-P | V-P | W-P | W-P |
| Element Loading | Co, Pt, $La_2O_3$ | Co, Pt, $La_2O_3$ | Co, Ru, $La_2O_3$ | Co, Ru, $La_2O_3$ | Co, Ru, Mn, $La_2O_3$ |
| Run Conditions: |  |  |  |  |  |
| Temperature, °C. | 220 | 220 | 230 | 230 | 230 |
| Pressure, psig (MPa) | 280 (1.93) | 280 (1.93) | 280 (1.93) | 280 (1.93) | 280 (1.93) |
| Space Velocity, cc/g/h | 8000 | 8000 | 6400 | 6400 | 7200 |
| $H_2$/CO ratio | 1.6 | 1.6 | 1.6 | 1.6 | 1.6 |
| Results: |  |  |  |  |  |
| CO Conversion, (mol %) | 34.7 | 41.6 | 52.1 | 53.5 | 52.3 |
| $C_{5+}$ Productivity, g/g/h | 0.446 | 0.532 | 0.529 | 0.544 | 0.597 |
| Selectivity, mol % |  |  |  |  |  |
| $CH_4$ | 6.7 | 6.4 | 5.6 | 5.3 | 5.8 |
| $C_2$ | 0.9 | 0.7 | 0.9 | 1.0 | 0.9 |
| $C_3$ | 2.6 | 2.4 | 2.4 | 2.4 | 2.5 |
| $C_4$ | 1.4 | 2.9 | 3.0 | 3.1 | 2.9 |
| $C_5+$ | 87.5 | 87.0 | 86.4 | 86.4 | 86.2 |
| $CO_2$ | 1.0 | 1.3 | 1.7 | 1.8 | 1.6 |

It can be seen from Table 3 that the performance of the Fischer-Tropsch catalysts prepared using the tungsten-phosphorus (W—P) modified alumina support showed improved CO Conversion and higher $C_{5+}$ Productivity compared to otherwise similar Fischer-Tropsch catalysts using vanadium-phosphorus (V—P) modified alumina supports, at the exact same Co loading of 25 wt %.

The transitional term "comprising", which is synonymous with "including," "containing," or "characterized by," is inclusive or open-ended and does not exclude additional, un-recited elements or method steps. The transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the claimed invention.

For the purposes of this specification and appended claims, unless otherwise indicated, all numbers expressing quantities, percentages or proportions, and other numerical values used in the specification and claims, are to be understood as being modified in all instances by the term "about." Furthermore, all ranges disclosed herein are inclusive of the endpoints and are independently combinable. Whenever a numerical range with a lower limit and an upper limit are disclosed, any number falling within the range is also specifically disclosed. Unless otherwise specified, all percentages are in weight percent.

Any term, abbreviation or shorthand not defined is understood to have the ordinary meaning used by a person skilled in the art at the time the application is filed. The singular forms "a," "an," and "the," include plural references unless expressly and unequivocally limited to one instance.

All of the publications, patents and patent applications cited in this application are herein incorporated by reference in their entirety to the same extent as if the disclosure of each individual publication, patent application or patent was specifically and individually indicated to be incorporated by reference in its entirety.

This written description uses examples to disclose the invention, including the best mode, and also to enable any person skilled in the art to make and use the invention. Many modifications of the exemplary embodiments of the invention disclosed above will readily occur to those skilled in the art. Accordingly, the invention is to be construed as including all structure and methods that fall within the scope of the appended claims. Unless otherwise specified, the recitation of a genus of elements, materials or other components, from which an individual component or mixture of components can be selected, is intended to include all possible sub-generic combinations of the listed components and mixtures thereof.

The invention illustratively disclosed herein suitably may be practiced in the absence of any element which is not specifically disclosed herein.

What is claimed is:

1. A process to make a Fischer-Tropsch catalyst with an improved hydrothermal stability, comprising:
   a. contacting a crystalline oxide material with a solution of a tungsten and a phosphorus to make a tungsten-phosphorus modified support; and
   b. calcining the tungsten-phosphorus modified support at a temperature less than or equal to 750° C. to make a calcined tungsten-phosphorus modified support that has the improved hydrothermal stability and that can be used to support a Co-loaded Fischer-Tropsch catalyst.

2. The process of claim 1, wherein the crystalline oxide material is selected from the group consisting of silica, alumina, zirconia, titania, ceria, lanthanum oxide, and mixtures thereof.

3. The process of claim 2, wherein the crystalline oxide material is an alumina.

4. The process of claim 3, wherein the alumina comprises particles having a particle size distribution from 10 μm to 200 μm.

5. The process of claim 1, wherein the solution comprises from 1.0 to 10 wt % of the tungsten and the phosphorus.

6. The process of claim 5, wherein the solution has a molar ratio of the tungsten to the phosphorus from 0.01 to 5.0.

7. The process of claim 1, wherein the solution has a pH less than 2.

8. The process of claim 1, wherein the solution is aqueous and comprises ammonium metatungstate and phosphoric acid.

9. The process of claim 1, wherein the calcined tungsten-phosphorus modified support has a total nitrogen BET pore volume of 0.2 to 0.6 cm$^3$/g.

10. The process of claim 1, wherein the calcined tungsten-phosphorus modified support has less than 25% of its total nitrogen BET pore volume lost when exposed to steam in a hydrothermal stability test with a heating duration of 2 hours.

11. The process of claim 1, additionally comprising impregnating the calcined tungsten-phosphorus modified support with a dissolved solution of a cobalt to make the Co-loaded Fischer-Tropsch catalyst.

12. The process of claim 11, wherein the Co-loaded Fischer-Tropsch catalyst comprises from 5 to 45 wt % of the cobalt.

13. The process of claim 11, wherein the dissolved solution of the cobalt additionally comprises a glutaric acid and a ratio of the glutaric acid in the dissolved solution to a surface area of the calcined tungsten-phosphorus modified support during the impregnating is from 2 to 15 µmol/m$^2$.

14. The process of claim 11, wherein the dissolved solution of the cobalt additionally comprises one or more promoters selected from the group consisting of platinum, palladium, ruthenium, manganese, silver, lanthanum, and cerium.

15. The process of claim 14, wherein the Co-loaded Fischer-Tropsch catalyst comprises 0.01 to 5 wt % of the one or more promoters.

16. The process of claim 11, wherein the Co-loaded Fischer-Tropsch catalyst has less than 5% of its total nitrogen BET pore volume lost when exposed to steam in a hydrothermal stability test with a heating duration of 500 hours.

17. The Co-loaded Fischer-Tropsch catalyst having the improved hydrothermal stability and higher $C_{5+}$ hydrocarbon productivity, made by the process of claim 11, and additionally comprising activating the Co-loaded Fischer-Tropsch catalyst.

18. The Co-loaded Fischer-Tropsch catalyst of claim 17, additionally providing greater CO conversion compared to an otherwise similar catalyst, wherein the otherwise similar catalyst is made with a different solution of a vanadium and the phosphorus to make a vanadium-phosphorus modified support instead of the tungsten-phosphorus modified support.

19. The Co-loaded Fischer-Tropsch catalyst of claim 17, comprising from 5 to 45 wt % of the cobalt, from 0.01 to 5 wt % of one or more promoters, and having a total nitrogen BET pore volume greater than 0.2 cm$^3$/g.

20. A Fischer-Tropsch synthesis process, comprising contacting a gaseous mixture comprising a carbon monoxide and a hydrogen with the Co-loaded Fischer-Tropsch catalyst of claim 17, at a pressure of from 0.1 to 3 MPa and at a reaction temperature of from 180 to 260° C., thereby producing a product comprising $C_{5+}$ hydrocarbons.

21. The Fischer-Tropsch synthesis process of claim 20, wherein a space velocity during the contacting is from 1000 to 10,000 cc/g/h and a CO conversion is from 40 to 60 mol %.

* * * * *